(12) United States Patent
Spatscheck et al.

(10) Patent No.: US 8,274,882 B2
(45) Date of Patent: Sep. 25, 2012

(54) BULK DATA TRANSPORT IN A NETWORK

(75) Inventors: Oliver Spatscheck, Randolph, NJ (US);
Han Q. Nguyen, Marlboro, NJ (US);
Steven H. Nurenberg, Manalapan, NJ (US); Gregory J. Smith, Shrewsbury, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 371 days.

(21) Appl. No.: 12/632,967

(22) Filed: Dec. 8, 2009

(65) Prior Publication Data

US 2011/0134748 A1    Jun. 9, 2011

(51) Int. Cl.
*G06F 11/00*    (2006.01)

(52) U.S. Cl. .................................... 370/216; 714/746

(58) Field of Classification Search .................. 370/216, 370/229–240, 395.42
See application file for complete search history.

(56) References Cited

U.S. PATENT DOCUMENTS

| | | | |
|---|---|---|---|
| 5,487,061 A | 1/1996 | Bray | |
| 5,553,061 A | 9/1996 | Waggener, Jr. et al. | |
| 5,799,002 A | 8/1998 | Krishnan | |
| 6,118,791 A | 9/2000 | Fichou et al. | |
| 6,643,259 B1 | 11/2003 | Borella et al. | |
| 2005/0089042 A1* | 4/2005 | Ruutu et al. ............. | 370/395.21 |
| 2007/0091923 A1 | 4/2007 | Elliot et al. | |
| 2007/0223456 A1* | 9/2007 | Maruyama et al. ........... | 370/352 |
| 2008/0144502 A1* | 6/2008 | Jackowski et al. ............ | 370/235 |

OTHER PUBLICATIONS

"Approaches to Congestion Control in Packet Networks," Mamatas et al., Department of Electrical and Computer Engineering, Demokritos University of Thrace, Journal of Internet Engineering, vol. 1, No. 1, Jan. 2007.

* cited by examiner

*Primary Examiner* — Luat Phung
(74) *Attorney, Agent, or Firm* — Larson Newman, LLP

(57) ABSTRACT

A network is configured to utilize available bandwidth to conduct bulk data transfers without substantially affecting the successful transmission of time-sensitive traffic in the network. In order to avoid this interference, the packets carrying data for bulk data transfers are associated with a low priority class such that the routers of the network will preferentially drop these packets over packets associated with the normal traffic of the network. As such, when the normal traffic peaks or there are link failures or equipment failures, the normal traffic is preferentially transmitted over the bulk-transfer traffic and thus the bulk-transfer traffic dynamically adapts to changes in the available bandwidth of the network. Further, to reduce the impact of dropped packets for the bulk-transfer traffic, the packets of the bulk-transfer traffic are encoded at or near the source component using a loss-resistant transport protocol so that the dropped packets can be reproduced at a downstream link.

20 Claims, 4 Drawing Sheets

BULK DATA TRANSPORT IN A NETWORK

FIELD OF THE DISCLOSURE

The present disclosure relates generally to data networks, and relates more particularly to bandwidth utilization in data networks.

BACKGROUND

Data networks frequently are used to deliver content and services. Service providers and content providers often distinguish themselves based on the quality of the provided services or content, one factor of which is the reliability and efficiency of the transmission of related data via the network. To improve the efficiency in which content and services are delivered, many content and service providers take a distributed approach whereby data is cached at multiple points within a core network so as to locate the data proximate to the end users. Thus, data networks often are called upon not only to deliver content and services to end users, but to facilitate the internal redistribution of the related data within the network itself.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
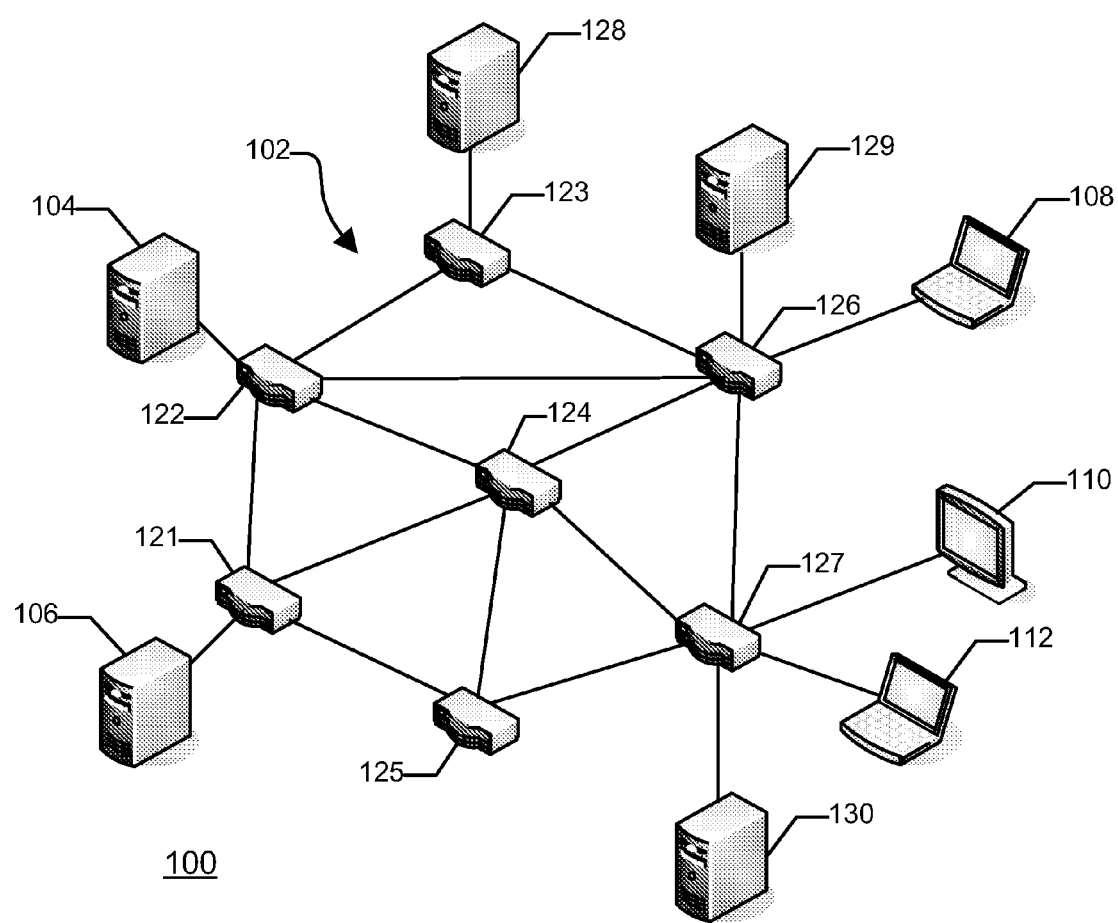
FIG. 1 is a diagram illustrating a network utilizing adaptive bandwidth control for bulk data transfers in accordance with at least one embodiment of the present disclosure.

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-4 illustrate techniques for using available bandwidth of a network to conduct bulk data transfers of relatively time-insensitive data without substantially affecting the successful transmission of time-sensitive data. Data core networks may be over-provisioned so as to accommodate the often cyclical nature of normal traffic loads, such as the daily traffic cycle that coincides with the waking and sleeping hours of end users. In addition to accommodating cyclical peak traffic conditions, such networks also are further over-provisioned so as to sustain multiple link and equipment failures. To illustrate, assuming a daily cycle in which the peak traffic between two routers is twice the low traffic point and the network implements two links between the two routers so as to sustain the failure of one link, the bandwidth capacity between the two routers would be four times the bandwidth needed during the low point. As such, this over-provisioning results in considerable unused bandwidth for much of the time. The present disclosure describes example techniques to utilize this excess available bandwidth for redistributing within the network data that is less time-sensitive than the traffic normally conducted via the network. The data transmitted using the excess available bandwidth typically includes bulk data transfers between a source server and one or more destination servers in the network. For example, multimedia content (such as movies, video clips, audio clips) may be multicast or otherwise transmitted from a content source to one or more cache servers so that end-users can subsequently access the multimedia content from a cache server rather than all end-users sourcing the multimedia content from the single content source server. As another example, log files and other administrative information may be periodically distributed from certain servers to a centralized accounting center.

To avoid the packet traffic from these bulk data transfers (hereinafter, "bulk-transfer traffic") from interfering with the packet traffic for normal time-sensitive data transmissions (hereinafter, "normal traffic"), the packets for the bulk data transfers are marked or otherwise associated with a low priority class such that the routers of the network will preferentially drop these packets in favor of packets associated with other higher priority classes reserved for the normal traffic. As such, when the normal traffic peaks or there are link failures or equipment failures, the normal traffic is preferentially transmitted over the bulk-transfer traffic and thus the bulk-transfer traffic dynamically adapts to changes in the available bandwidth of the network caused by changes in the normal traffic flow. Further, to reduce the impact of situations whereby network congestion results in dropped packets for the bulk-transfer traffic, the packets of the bulk-transfer traffic are encoded at or near the source component using a loss-resistant transport protocol so that the dropped packets can be replicated at a downstream link and thus avoiding the need to retransmit dropped packets. Through this use of both preferential packet dropping for bulk-transfer traffic and the encoding of bulk-transfer traffic with redundancy information, the bulk-transfer traffic and normal traffic together can utilize the entire bandwidth of the network (or nearly so) while being able to accommodate fluctuations in the normal traffic flow and link and equipment failures without substantial impact to the throughput of the normal traffic. As the bulk-transfer traffic adapts to the bandwidth unused by the normal traffic at any given point, and due to the time-insensitive (relatively) nature of the data transmitted during the bulk-transfers, the bulk-transfer traffic need not be considered during capacity planning and thus no additional resources need be spent on providing multiple-link redundancy or peak-traffic accommodations for the bulk-transfer traffic.

FIG. 1 illustrates a network 100 implementing adaptive bulk data transfers in accordance with at least one embodiment of the present disclosure. In the depicted example, the network 100 includes a plurality of interconnected network components, including a core network 102 connecting one or more providers, such as service provider 104 and content provider 106, to one or more end-user devices, such as end-user devices 108, 110, and 112. The end-user devices 108-112 can include any of a variety of devices utilizing the services and content provided by the network 100, such as personal computers; set-top boxes or personal video recorders (PVRs); mobile devices such as mobile phones or personal digital assistants; or networked home entertainment systems, such as Internet Protocol Television (IPTV) systems. The core network 102 includes a network of routers and intermediary servers, whereby the routers are configured to route packet traffic between the service providers, the end-user devices, and the intermediary servers. FIG. 1 illustrates a simplified example of a core network having routers 121-127 and intermediary servers 128-130 connected in the depicted manner. The intermediary servers, in one embodiment, operate to cache data frequently requested by the end-user devices so as to reduce the overall network traffic and place frequently-requested data closer (topology-wise) to the end-user devices. As such, the intermediary servers also are commonly referred to as "cache servers."

In operation, the core network 102 facilitates the transmission of relatively time-sensitive packet traffic (referred to herein as the "normal traffic") between the providers 104 and 106, the cache servers 128-130, and the end-user devices 108-112. This normal traffic can include, for example, data communicated in accordance with services provided by the service provider 106, such as SMS data traffic, e-mail traffic, voice traffic such as Voice over IP (VoIP) traffic, video conferencing traffic, and the like. The normal traffic further can include data content provided by the content provider 104, as well as data communicated between end-user devices or data communicated from the end-user devices and the providers 104 and 106. Further, because the network 100 is over-provisioned such that there is excess bandwidth available in the network at numerous points during any given day, the network can be used to conduct bulk data transfers that utilize this excess bandwidth. These bulk data transfers can include, for example, transfers of data-intensive content from a content provider to one or more cache servers in anticipation of subsequent requests for the content from end-user devices. To illustrate, many multimedia websites post large volumes of new multimedia content every day. However, a large fraction of this multimedia content has a relatively low cache hit ratio. Accordingly, the multimedia websites may employ multiple cache servers distributed throughout a network, such as the Internet, and use multicasting techniques to distribute the multimedia content to some or all of the deployed cache servers. However, because of the low cache hit rate of this multimedia content and because this multimedia content can be obtained from alternate sources, the delivery of the multimedia content is less time-sensitive than other traffic conducted via the core network 102. These bulk data transfers also can include, for example, the transfer of log data or other network administration information from one or more servers to a centralized administrative center.

The bulk-transfer traffic is adapted to the dynamic changes in the bandwidth unused by the normal traffic so as to avoid impeding the normal traffic. In this manner, the bulk-transfer traffic can be accommodated without requiring its consideration in the capacity planning process for the core network 102. In one embodiment, this dynamic bandwidth adaptation process includes two components: a preferential dropping scheme; and a loss-recovery scheme. In order to ensure that normal traffic is not materially affected by the bulk-transfer traffic, the packets of the bulk-transfer traffic are marked or otherwise associated with a low priority class reserved for bulk data transfers such that the routers of the core network 102 are configured to preferentially drop the packets of the bulk-transfer traffic over packets of the normal traffic that are associated with a set of one or more higher priority classes reserved for normal traffic. As such, bulk-transfer traffic will be conducted via the corresponding links of the core network 102 using the slack bandwidth unused by the normal traffic.

The lower priority class of the bulk-transfer traffic typically results in some number of dropped packets in the bulk-transfer traffic due to cyclical peaks in the normal traffic and due to link/equipment failures. While certain retransmission protocols may be used to arrange for the retransmission of dropped packets in the bulk-transfer traffic, such as by using a Transport Control Protocol (TCP) retransmission mechanism, the retransmission of dropped packets for the bulk-transfer traffic may consume available bandwidth that otherwise could be allocated to the original transmission of additional bulk-transfer traffic. Accordingly, to facilitate effective near-complete utilization of the bandwidth of the network 100, the network implements a loss-resistant transport mechanism that achieves acceptable application-layer throughput even during frequent packet loss at the transport layer and without requiring the use of a packet retransmission mechanism. In at least one embodiment, this loss-resistant transport mechanism includes the encoding of the packets of the bulk-transfer traffic using forward error correction (FEC) or another loss-recovery encoding protocol such that the dropped packets can be replicated at a destination device using the encoded redundancy information from a subset of received packets. The loss-recovery encoding can be adapted based on loss statistics measured within the network or measured at the end-user device. Through the combination of preferential dropping of bulk-transfer traffic and the loss-resistant encoding of bulk-transfer traffic, the network 100 can facilitate nearly complete bandwidth utilization between both the normal traffic and the bulk-transfer traffic while ensuring that the normal traffic is not substantially impeded and while ensuring that the application layer throughput of the bulk-transfer traffic is acceptable even when loss is present.

Figure 2:
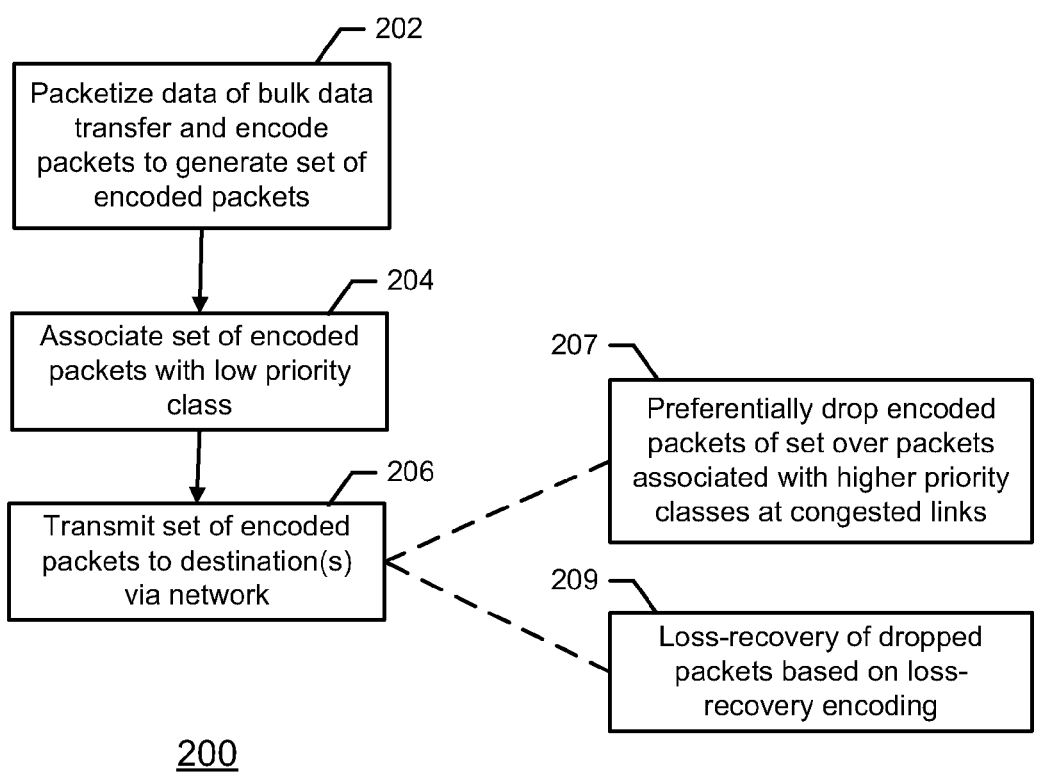
FIG. 2 is a flow diagram illustrating a method for conducting bulk data transfers concurrent with normal traffic in the network of FIG. 1 in accordance with at least one embodiment of the present disclosure.

FIG. 2 illustrates an example method 200 for conducting a bulk data transfer via the network 100 of FIG. 1 in accordance with at least one embodiment of the present disclosure. At block 202, data to be transmitted via a bulk data transfer is packetized into a set of packets and the packets are encoded in accordance with a redundancy protocol or other loss-resistant transport protocol so as to permit recovery of the data contained in those packets that are dropped by the network 100 during transmission. Example redundancy encoding schemes include, but are not limited to, FEC. The degree of encoding can be dynamically adjusted based on loss statistics measured by the network 100 or the receiving device. At block 204, the resulting set of encoded packets is marked or otherwise associated with a lower priority class. This association can be accomplished by storing a particular value to a header field of each packet. In an alternate embodiment, the packets of the bulk data transfer are first associated with the lower priority class and then encoded. The encoding and prioritization of the set of packets can be performed by the server that serves as the source of the data. To illustrate, the service provider 104 may packetize the data and then encode the resulting packets, and associate the resulting packets with the lower priority class before providing the resulting encoded packets to the router 122 for transmission via the core network 102. Alternately, the encoding and association may be performed at the router of the core network 102 that interfaces with the server that sources the data. To illustrate, the service provider 104 may packetize data to be handled as a bulk data transfer into a set of packets and then stream the packets to the router 122 along with an indication that the set of packets is a relatively time-insensitive bulk data transfer. In response, the router 122 may encode the set of packets to generate the set of encoded packets and associate the resulting encoded packets with the lower priority class before streaming the set of encoded packets to the next router in the path to the destination of the bulk data transfer.

At block 206, the set of encoded packets is provided to the core network 102 for transmission to the one or more intended destinations (such as the cache servers 128-130). The set of encoded packets may be transmitted via the core network 102 as a unicast transmission to a single destination or as a multicast or broadcast transmission to multiple destinations. The core network 102 conducts the transmission of the set of encoded packets as bulk-transfer traffic interleaved with the normal traffic of the core network 102 as described above. This bulk data transfer of the set of encoded packets may be subjected to one or more processes associated with the bulk-transfer status. As depicted by block 207, the lower priority class associated with the encoded packets of the bulk data transfer subjects the encoded packets to preferentially dropping in favor of packets in the normal traffic (that is, packets of higher priority classes reserved for normal traffic) at routers having congested outgoing links. Further, this preferential dropping scheme typically results in dropped packets for the bulk-transfer traffic, particularly in the event of a peak in the normal traffic or in the event of a link failure or equipment failure. Thus, as illustrated by block 209, the transmission of the set of encoded packets can include the replication of dropped encoded packets at a receiving router (or at a destination) using the redundancy information encoded into other encoded packets through the loss-recovery encoding performed at block 202.

Figure 3:
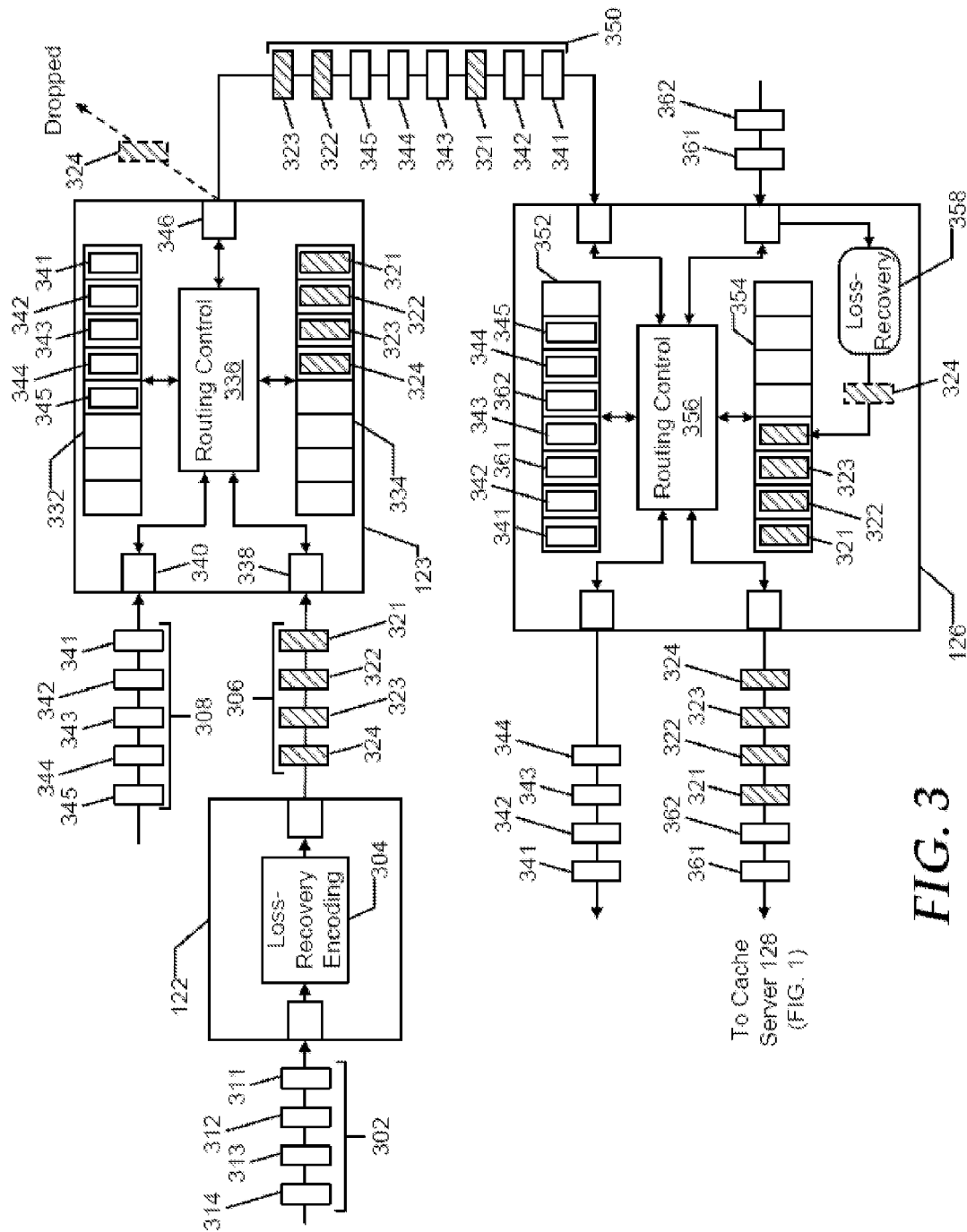
FIG. 3 is a diagram illustrating an example of the method of FIG. 2 in the network of FIG. 1 in accordance with at least one embodiment of the present disclosure.

FIG. 3 illustrates an example implementation of the method 200 for conducting a bulk data transfer of data concurrent with normal traffic in the network 100 of FIG. 1 in accordance with at least one embodiment of the present disclosure. In the depicted example, the service provider 104 (FIG. 1) initiates a bulk data transfer of data for caching at the cache server 129 by packetizing the data into a set 302 of packets 311-314 and providing the set 302 to the router 122 along with an indication that the set 302 of packets is to be handled as a bulk data transfer. Note that although the four packets are illustrated for ease of description, a bulk data transfer typically would include more than four packets. As the set 302 of packets is received by the router 122, a loss-recovery encoding module 304 encodes the packets 311-314 using FEC or another loss-recovery encoding protocol to generate a set 306 of encoded packets 321-324. The loss-recovery encoding can be at a fixed level or adapted based on dynamic loss statistics. The router 122 then forwards the set 306 of encoded packets to the router 123 as the next hop in an identified path to the cache server 129.

As described above, some or all of the routers of the core network 102 are configured to implement a preferential drop mechanism whereby packets associated with bulk-transfer traffic are preferentially dropped over packets associated with normal traffic. As illustrated by the router 123 of FIG. 3, this preferential drop mechanism can be implemented through the use of separate output buffers 332 and 334, whereby a routing control module 336 of the router 123 uses the output buffer 332 to buffer packets associated with the normal traffic and uses the output buffer 334 to buffer packets associated with bulk-transfer traffic. To illustrate, FIG. 3 depicts a situation in which the router 123 receives the set 306 of encoded packets at an interface 338 and also receives a set 308 of packets 341-345 from the normal traffic flow at an interface 340, with both the set 306 and the set 308 to be output via the same interface 346. The routing control module 336 identifies the priority class associated with each incoming packet, and buffers the incoming packet in one of the output buffer 332 or the output buffer 334 based on the identified priority class. Thus, the routing control module 336 buffers the packets 341-345 in the output buffer 332 and buffers the packets 321-324 in the output buffer 334. The routing control module 336 then selects between the output buffers 332 and 334 for packets to be output via the interface 346, whereby packets in the output buffer 332 are preferentially selected over packets in the output buffer 334 in the event that there is congestion at the network link to which the interface 346 is connected.

In the illustrated example, the operation of the routing control module 336 and the circumstances of the downstream link result in the output of a stream 350 of packets 341, 342, 321, 343, 344, 345, 322, and 323. Further, for this example the router 123 drops the encoded packet 324 based on its lower priority status so as to avoid interfering with the transmission of the packets 341-345 of the normal traffic flow. The stream 350 is received by the router 126. A routing control module 356 of the router 126 parses the stream 350 based on priority class so as to buffer the packets 341-345 of the normal traffic in an output buffer 352 and to buffer the packets 321, 322, and 323 in a separate output buffer 354. Further, the router 126 implements a loss-recovery module 358 to replicate the dropped encoded packet 324 using the redundancy information encoded into the data payloads of one or more of the encoded packets 321-323. The recovered packet 324 is then buffered in the output buffer 354 with the other encoded packets 321-323. As illustrated in FIG. 3, the router 126 concurrently receives packets 361 and 362 associated with the normal traffic flow and thus the packets 361 and 362 are buffered in the output buffer 352 due to their associated higher priority classes. The routing control module 356 then selects packets from the output buffers 352 and 354 for output to a respective one of two downstream links, whereby the packets 341-344 are provided for transmission via a first downstream link and the packets 361 and 362 and the encoded packets 341-344 are provided for transmission to the cache server 128 via the other downstream link. In the illustrated example, the downstream links are not congested and thus none of the encoded packets 341-344 are selected for dropping by the router 126.

As illustrated by FIG. 3, the transmission of bulk-transfer traffic and normal traffic can coincide to the extent that network bandwidth is available in excess of that needed to conduct the normal traffic. In instances of peak normal traffic or link/equipment failure, the normal traffic takes precedence over the bulk-transfer traffic, which may cause loss of some of the packets of the bulk-transfer traffic. However, the loss-recovery encoding performed on the packets of the bulk-transfer traffic permits dropped bulk-transfer traffic packets to be reconstructed within the network, thereby avoiding the requirement of packet retransmission for dropped bulk-transfer packets. The lower prioritization of bulk-transfer traffic for packet drop selection coupled with the loss-recovery mechanism for those bulk-transfer traffic packets that happen to get dropped facilitates the near-complete utilization of a network's bandwidth without requiring consideration of the bulk-transfer traffic during capacity planning for the network.

Figure 4:
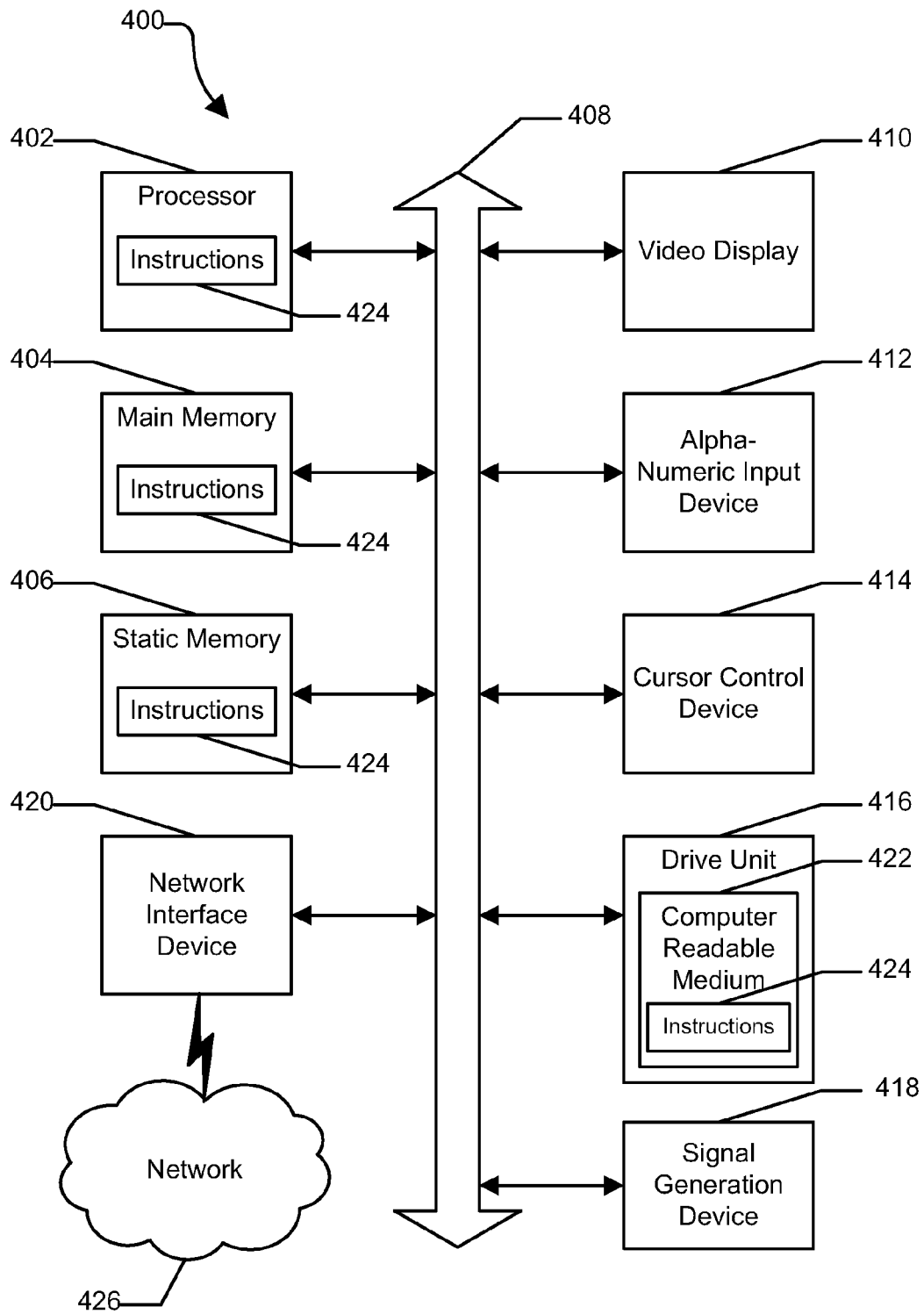
FIG. 4 is a diagram illustrating an example computer system for implementing one or more of the components or techniques described herein in accordance with at least one embodiment of the present disclosure.

FIG. 4 shows an illustrative embodiment of a general computer system 400 in accordance with at least one embodiment of the present disclosure. The computer system 400 can include a set of instructions that can be executed to cause the computer system 400 to perform any one or more of the methods or computer-based functions described above. The computer system 400 may operate as a standalone device or may be connected via a network to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into, for example, a STB device. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal, so that a device connected to a network can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission such as TCP/IP, UDP/IP, HTML, and HTTP represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
    encoding, at one of a plurality of components of a network, first packets associated with a bulk data transfer in accordance with a redundancy protocol that facilitates replication of data of a dropped first packet using redundancy encoding information of said dropped first packet included in other first packets;
    associating the first packets with a select priority class; and
    transmitting the first packets via the network such that the first packets are preferentially dropped in favor of second packets in the event of a congested network link, the second packets being associated with at least one priority class having higher priority than the select priority class.

2. The method of claim 1, wherein the redundancy protocol comprises forward error correction.

3. The method of claim 1, wherein the bulk data transfer comprises a distribution of data to one of a plurality of cache servers of the network.

4. The method of claim 3, wherein the data comprises multimedia content.

5. The method of claim 1, wherein the bulk data transfer comprises a transfer of network administration information.

6. The method of claim 1, wherein transmitting the first packets via the network comprises:
    dropping a select packet of the first packets at a first router;
    transmitting a subset of the first packets from the first router to a second router; and
    replicating data of the select packet at the second router based on redundancy encoding information included in the subset of the first packets received at the second router.

7. The method of claim 1, wherein the one of a plurality of components comprises one of a plurality of servers that source data encapsulated in the first packets.

8. The method of claim 1, wherein the one of a plurality of components comprises one of a plurality of routers coupled to one of a plurality of servers that source data encapsulated in the first packets.

9. The method of claim 1, further comprising:
    considering a bandwidth needed for transmitting the second packets and omitting consideration of a bandwidth needed for transmitting the first packets in a capacity planning process for the network.

10. A network comprising:
    a plurality of interconnected network components, the plurality of network components including a plurality of routers, and whereby:
        a select network component of the plurality of network components encodes a first set of packets in accordance with a redundancy protocol to generate an encoded set of packets and associates the encoded set of packets with a select priority class, the redundancy protocol facilitating replication of data of a dropped packet of the encoded set of packets using redundancy encoding information of said dropped packet included in other packets of the encoded set of packets; and
        each router of at least a subset of the plurality of routers preferentially drops packets associated with the select priority class over packets associated with other priority classes.

11. The network of claim 10, wherein the redundancy protocol comprises forward error correction.

12. The network of claim 10, wherein the first set of packets represents a bulk data transfer of data within the network.

13. The network of claim 12, wherein the bulk data transfer of data comprises a redistribution of data from one server to one of a plurality of cache servers of the network.

14. The network of claim 12, wherein the bulk data transfer comprises a transfer of network administration information.

15. The network of claim 10, wherein the select network component comprises a server that sources data encapsulated in the first set of packets.

16. The network of claim 10, wherein the select network component comprises a router coupled to a server that sources data encapsulated in the first set of packets.

17. In a network comprising a plurality of servers interconnected via a plurality of routers, a method comprising:
    routing packets associated with respective priority classes of a set of priority classes between the plurality of servers using the plurality of routers;
    encoding a set of packets for a bulk data transfer of data between servers based on a redundancy protocol to generate a set of encoded packets, the redundancy protocol facilitating regeneration of data of a dropped packet of the encoded set of packets using redundancy encoding information of said dropped packet included in other packets of the encoded set of packets;
    associating the packets of the set of encoded packets with a select priority class of the set of priority classes, the select priority class reserved for bulk data transfers; and
    transmitting the set of encoded packets from a first server to a second server via a subset of the plurality of routers, each router of the subset preferentially dropping packets associated with the select priority class in favor of packets associated with other priority classes of the set of priority classes.

18. The method of claim 17, wherein the redundancy protocol comprises forward error correction.

19. The method of claim 17, wherein the bulk data transfer of data comprises a redistribution of data from one server to one of a plurality of cache servers of the network.

20. The method of claim 17, wherein the bulk data transfer comprises a transfer of log information.

* * * * *